United States Patent [19]

Kloos

[11] Patent Number: 4,906,483

[45] Date of Patent: Mar. 6, 1990

[54] NO-FAT, NO-CHOLESTEROL, SALT-FREE, POTATO COOKING PROCESS

[76] Inventor: Sharon C. Kloos, P.O. Box 1823, Oracle, Ariz. 85623

[21] Appl. No.: 250,568

[22] Filed: Sep. 29, 1988

[51] Int. Cl.$^4$ ............................ A23B 7/03; A23L 3/16
[52] U.S. Cl. ................................... 426/243; 426/509; 426/637
[58] Field of Search ............... 426/242, 243, 509, 637, 426/804

[56] References Cited

U.S. PATENT DOCUMENTS

| | | | |
|---|---|---|---|
| 3,881,028 | 4/1975 | Capossela et al. | 426/242 |
| 3,904,429 | 9/1975 | Eastman et al. | 127/71 |
| 4,073,952 | 2/1978 | Standing et al. | 426/242 |
| 4,098,906 | 7/1978 | Hisaki et al. | 426/94 |
| 4,283,425 | 8/1981 | Yuan et al. | 426/102 |

*Primary Examiner*—George Yeung
*Attorney, Agent, or Firm*—Cahill, Sutton & Thomas

[57] ABSTRACT

This invention discloses a cooking process for potato products such as potato chips, french fry-like potatoes that have an ingredient characteristic of no-fat, no-cholesterol and salt-free that is attractive from a dietary perspective. The process includes the steps of microwave cooking sliced potatoes in water for purposes of releasing undesirable potato starch from the potatoes utilizing a transparent color transformation as an indicator of doneness. Once the potatoes have gone the color transformation the hot water is dumped and the potatoes are rinsed in cold water to remove visible potato starch. After rinsing the potatoes are then arranged in a planar fashion on a non-stick cooking sheet and placed in a conventional radiant heat oven for browning and crispening to produce a no-fat, no cholesterol, salt-free potato product. After crispening and browning the potato product is ready for consumption or prepared for packaging, such as by freezing, for later consumption using known packaging methods.

11 Claims, 2 Drawing Sheets

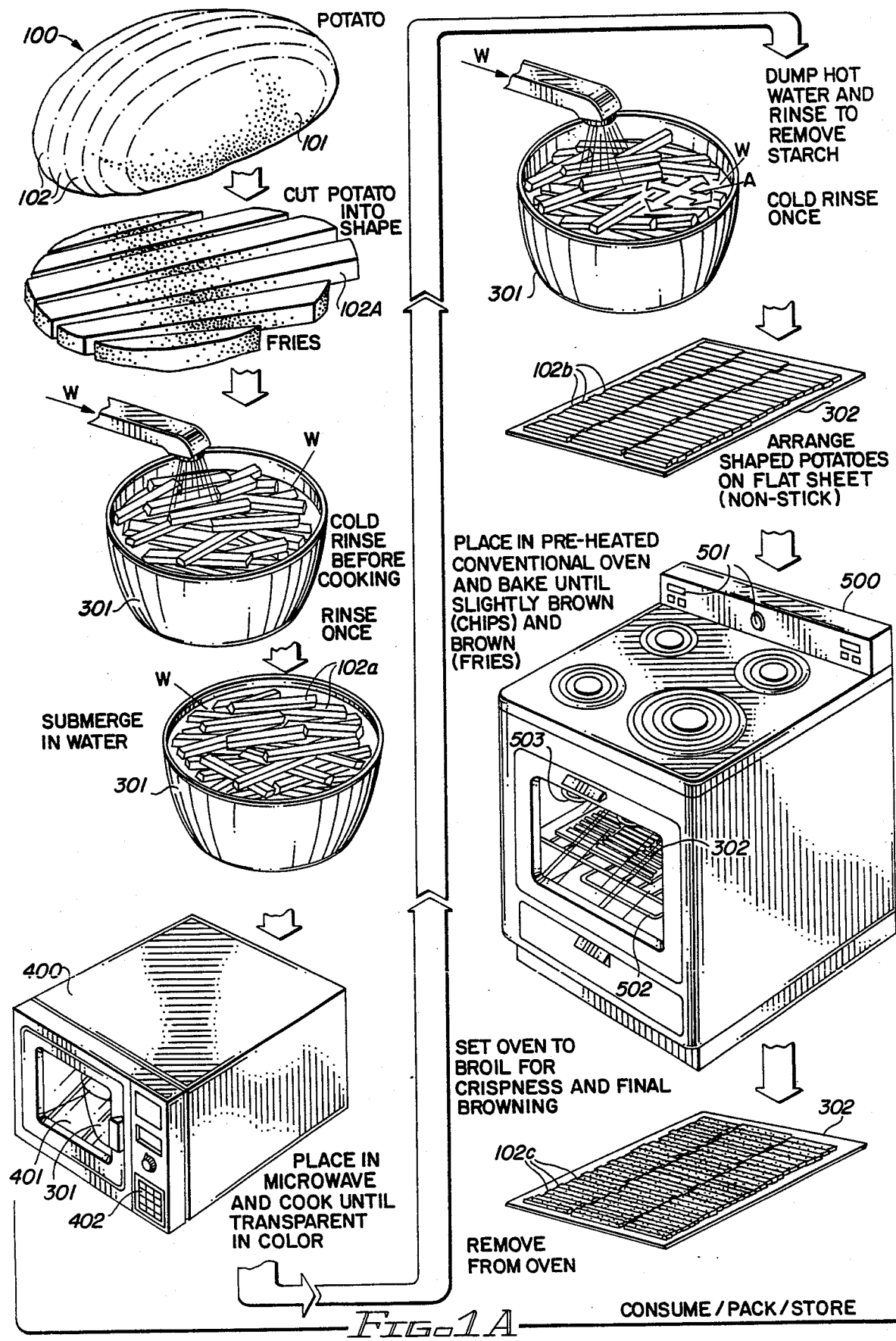

NO-FAT, NO-CHOLESTEROL, SALT-FREE, POTATO COOKING PROCESS

FIELD OF THE INVENTION

The present invention relates to potato products and more particularly, to cooking processes for cooking potato products commonly referred to as potato chips and french fried potatoes. Even more particularly, the present invention relates to cooking processes for cooking potato products that do not use fat, cholesterol or salt and that have combined utilization of the microwave oven and conventional radient heat ovens.

DESCRIPTION OF THE PRIOR ART

The popularity of potato products such as potato chips and french fries as snacks and as an entre item is well known and has become a major contributor to the calories consumed in a day by the consuming public. The manufacturers and cooks in restaurants have become very much aware of this dietary concern by the consuming public and have responded by introducing low fat potato chips having a fat content ranging from 0% to 45%. The processes employed include using microwave ovens in combination with conventional radiant heat, forced air type of ovens. The most comprehensive teachings in the field of the present invention can be found in U..S Pat. No. 4,283,425 to Yuan et al. and assigned to the General Foods Corporation. The patent teaches a low fat potato chip prepared using a process involving a microwave and a protein coating and an optional edible oil coating. The patent does teach eliminating deep fat frying and the sole use of a microwave oven to reduce water, provide color, crispen and flavor normally provided by deep fried potato chips, however the process does not discuss removing all of the potato starch that could be removed before the final crispening stage. The protein coating or edible oil coating added to produce the final product may not appeal to the consuming public as an added ingredient.

Other known efforts in the field of the invention concerns the teachings of U.S. Pat. No. 3,904,429 to Eastman et al. that teaches a cold water swelling starch product, produced by using a microwave oven, the end product is intended for frying. Also, the teachings of U.S. Pat. No. 4,098,906 to Hisaki et al. that teaches a process for cooking noodles in a non-fried manner involving a microwave oven for drying.

The processes that combine microwave and conventional radiant heat cooking in the cooking process have consistently employed the microwave oven in the last stage of cooking for browning or removal of moisture, rather than employing the use of the microwave oven to activate the release of the potato starch.

Therefore, a need is seen to exist for a potato product cooking process that will effectively produce a no-fat, no-cholesterol, salt-free potato product. Accordingly, it is a primary objective of the present invention to provide a cooking process that provides a no-fat, no-cholesterol, salt-free potato product, such as potato chips and french fried potatoes.

SUMMARY OF THE INVENTION

The present invention provides a cooking process for producing potato products commonly referred to as potato chips and french fries. The process is directed at producing these potato products having a no-fat, no-cholesterol and salt-free ingredient characteristic that is attractive from a dietary perspective. The process comprises the steps of placing a pan containing previously rinsed and sliced potatoes, that may be either cut into a chips or french fry shape, that are submerged in water into a microwave oven for microwave cooking until the submerged potatoes are visibly transparent. The microwave cooking step is preferably executed with the microwave oven at a maximum microwave heating setting and an oven having a glass window door for viewing the cooking process for checking and ascertaining that the potatoes have gone a color transformation to a transparent color. The cooking cycle may not necessarily attain a water boiling characteristic, since the objective of the microwave cooking is to achieve a color transformation in the potatoes that results in a release of the undesirable potato starch. Once the potatoes have gone the color transformation the hot water is dumped and rinsed in cold water to remove visible starch, the rinsing has been found to produce better tasting if done only once for the fries and twice for the chips. After rinsing, the potatoes are then arranged in a planar fashion on a non-stick cooking sheet and placed in a conventional radiant heat oven for browning and crispening to produce a fat/cholesterol/salt-free potato product. The browning and crispening cycle for the chips has been found to produce a crisper and better tasting product if the chips are lightly browned first then removed from the oven for 20 to 30 minutes to cool then reintroduced for final browning and crispening. After crispening and browning the potato product is ready for consumption or prepared for packaging, such as by freezing, for later consumption using known packaging methods.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 1a is a process flow representation of the present invention illustrating the steps in producing a french fry-like potato product.

DESCRIPTION OF THE PREFERRED EMBODIMENTS

Figure 1B:
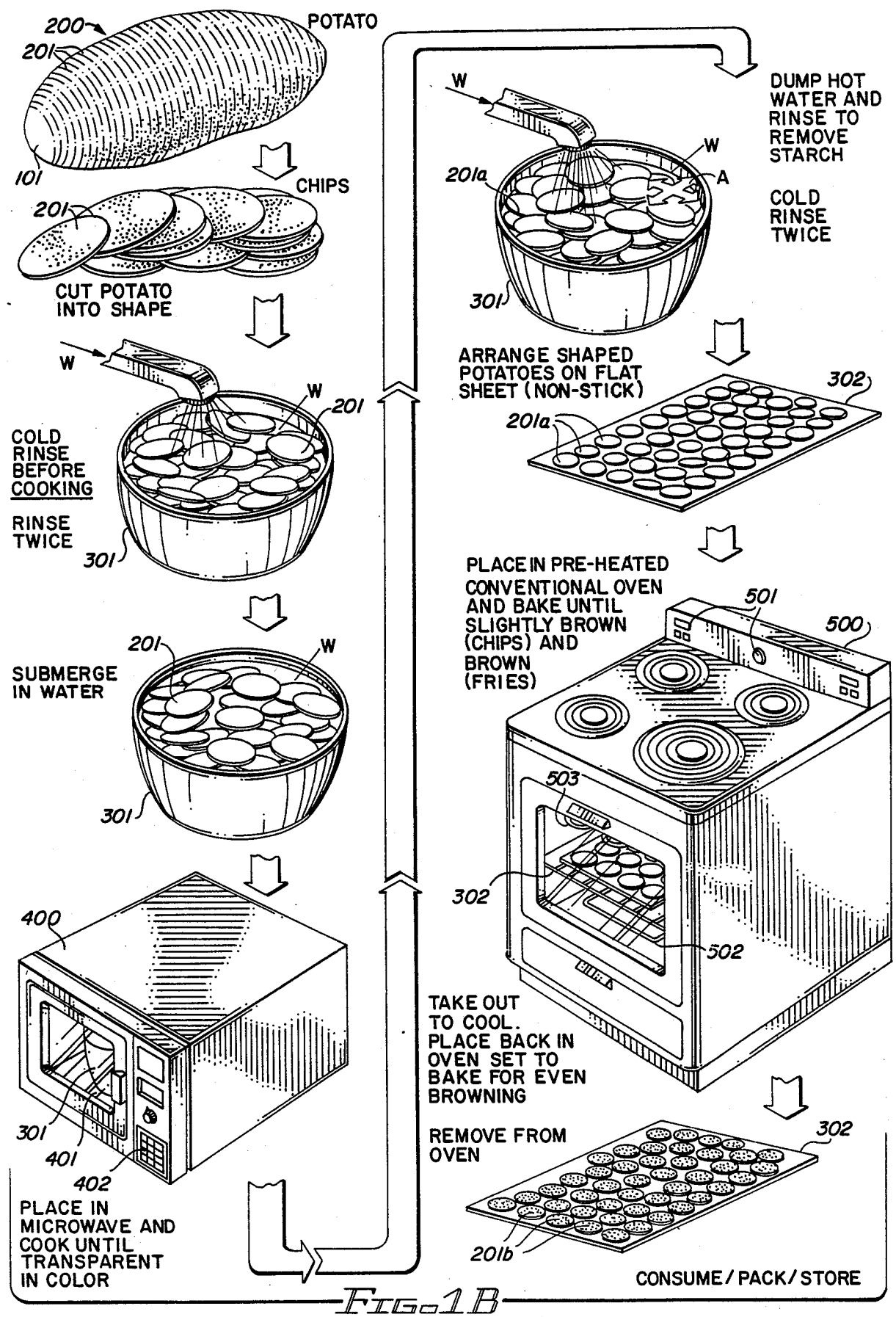
FIG. 1b is a process flow representation of the present invention illustrating the steps in producing a potato chip product.

Referring now to FIGS. 1a and 1b, where the present invention is shown in a process flow manner for producing a french fry-like and a potato chip product, respectively. As previously stated the process is directed at producing these potato products having a no-fat, no-cholesterol and salt-free ingredient characteristic. The process comprises of french-fry-like cooking process 100 and potato chip cooking process 200 wherein in process 100 a potato 101 is sliced into a sliver section 102 that are further cut into a fries shape 102a as shown in FIG. 1a. Similarly in process 200 a potato 101 is sliced into individual chip slices 201. The quantity of cut fries 102a or chips 201 may vary according to the cooking batch being prepared. Once the batch size is established then the cut fries 102a or chips 201 are rinsed in cold water w in a pan 301, preferably using manual swishing action to agitate the potatoes 102a,201 to initially remove surface potato starch, however other mechanical means may be employed to accomplish the same results. The rinsing process for fries 102a has been found to produce a tastier product if limited to one rinsing operation, while, the rinsing operation for the potato chip 201 has been found to produce a tastier product if the agitated rinsing is done at least twice. After rinsing potatoes 102a,201 are ready for the first cooking cycle in a microwave oven. The cooking container may be the same container used in the rinse cycle, but regardless the choice must be suitable for microwave oven cooking. The potatoes 102a,201 are fully submerged in water w of cooking container 301 and then placed in microwave oven 400 provided with transparent door 401 and cooking controls 402. The cooking control may vary depending upon the batch size and timing considerations in the total process but may be readily determined by a person skilled in the art of cooking and setting process control criteria. As an example, one (1) averaqe sized potato, (approximately 5 inches by 3 inches) when prepared according to the present invention as fries 102a or chips 201, in a 700 watt rated microwave oven, in a high cooking setting, a cooking time ranging from 1.5 to 2.5 minutes was seen to produce an acceptable product. The primary object of the microwave cooking is to achieve a transformation in color of the cooking potatoes 102a,201 from a natural potato white color to one of being translucent. The translucent stage apparently is one where potato starch is released from the body of the potato and can be washed away. Once the microwave cooked potatoes 102b,201a reach the translucent stage, which stage can be readily ascertained an controlled by a person skilled in the art, the hot water is dumped and an agitated rinsing cycle is done, as indicated by arrows A. Again, rinsing the chips 201a twice has been observed as producing an acceptable product.

The next cooking stage is a browning and crispening step that utilizes a conventional radiant heat oven 500 provided with cooking control 501, a baking element 502 and a broiling element 503. The visibly transparent potatoes 102b,201a are placed in a planar arrangement on a flat, non-stick cooking sheet 302 then placed inside of oven 500 for radiant cooking using controls 501 set at 425 degrees farenhent for a period of at least five (5) minutes. As in any cooking process there are many possible setting for the time and temperature to achieve the browning and crispening. Suffice it to say that the optimization of these settings are best determined by the person skilled in the art at the time of implementation. However, in the production of chips, it has been determined that if the chips 201b are first lightly browned, then allowed to cool for a short period of time, approximately 20 to 30 minutes, and then reintroduced to oven 500 for baking using element 502, that a crispier and for evently browned product is produced. The cooked potato chips 201b and fries 102c are removed from oven and are ready for consumption, packaging for freezing using known commercially and industrial methods. The product produced is believed to be a no-fat, no-cholesterol, salt-free potato product.

Therefore, while the present invention has been shown and described herein in what is believed to be the most practical and preferred steps, it is recognized that departures can be made therefrom within the scope of the invention, which is therefore not to be limited to the details disclosed herein but is to be accorded the full scope of the claims so as to embrace any and all equivalent process.

I claim:

1. A fat/cholesterol/salt-free cooking process for producing potato products, said process comprising the steps of:
   (a) placing a pan containing previously rinsed and sliced potatoes submerged in water into a microwave oven;
   (b) microwave cooking said sliced potatoes submerged in water by cooking until said potatoes are visibly transparent;
   (c) rinsing said cooked, visibly transparent potatoes at least once to remove visible starch; and
   (d) radiant cooking said rinsed visibly transparent potatoes in a conventional oven until a desired browning color and crispness is achieved to produce a fat/cholesterol/salt-free potato product.

2. A fat/cholesterol/salt-free cooking process as recited in claim 1, wherein:
   said previously rinsed and sliced potatoes comprises potatoes cut into a potato chip shape; and
   said produced fat/cholesterol/salt-free potato product is a potato chip product.

3. A fat/cholesterol/salt-free cooking process as recited in claim 2, wherein:
   said previously rinsed and sliced potatoes comprises unpeeled potatoes cut into a potato chip shape.

4. A fat/cholesterol/salt-free cooking process as recited in claim 1, wherein:
   said previously rinsed and sliced potatoes comprises potatoes cut into a french fried potato shape; and
   said fat/cholesterol/salt-free potato product is a french fried-like potato product.

5. A fat/cholesterol/salt-free cooking process as recited in claim 4, wherein:
   said previously rinsed and sliced potatoes comprises unpeeled potatoes cut into a french fried potato shape.

6. A fat/cholesterol/salt-free cooking process for producing potato products, said process comprising the steps of:
   (a) providing potatoes sliced to a desired shape;
   (b) placing said sliced potatoes in a pan for rinsing;
   (c) rinsing said sliced potatoes at least once with cold tap water;
   (d) placing said rinsed potatoes in a pan suitable for microwave cooking;
   (e) filling said pan with said rinsed potatoes with water to a level that assures that all said rinsed potatoes are fully submerged;
   (f) placing said pan containing said rinsed potatoes fully submerged in water in a microwave oven;
   (g) microwave cooking said rinsed potatoes in said pan placed in said microwave oven by cooking until said potatoes are visibly transparent;
   (h) removing said pan containing said visibly transparent potatoes from said microwave oven;
   (i) dumping hot water from said pan removed from said microwave oven;
   (j) cold water rinsing said visibly transparent potatoes at least once to remove visible starch;
   (k) arranging said rinsed potatoes in a planar arrangement on a flat, non-stick cooking sheet;
   (l) placing said flat cooking sheet with arranged rinsed potatoes in conventional oven for radiant cooking;

(m) radiant cooking said rinsed potatoes in said conventional oven until a desired browning color and crispness is achieved to produce a fat/cholesterol/salt-free potato product; and (n) removing said produced fat/cholesterol/salt-free potato product from said conventional oven and prepare for consumption.

7. A fat/cholesterol/salt-free cooking process as recited in claim 6, wherein:

said step of providing a potato sliced to a desired shape comprises providing potatoes cut into a potato chip shape; and said step of rinsing said visibly transparent potatoes comprises rinsing at least twice with cold water.

said produced fat/cholesterol/salt-free potato product being a potato chip product.

8. A fat/cholesterol/salt-free cooking process as recited in claim 7, wherein:

said step of providing a potato sliced to a desired shape comprises providing unpeeled potatoes cut into a potato chip shape.

9. A fat/cholesterol/salt-free cooking process as recited in claim 7, wherein:

said step of radiant cooking said visibly transparent potatoes in said conventional oven comprises a step of lightly browning then removing from said conventional oven to cool for 20 to 30 minutes then reintroducing into said conventional oven for final browning and crispening.

10. A fat/cholesterol/salt-free cooking process as recited in claim 6, wherein:

said step of providing a potato sliced to a desired shape comprises providing potatoes cut into a french fried potato shape; and said produced fat/cholesterol/salt-free potato product is a french fried-like potato product.

11. A fat/cholesterol/salt-free cooking process as recited in claim 10, wherein:

said step of providing a potato sliced to a desired shape comprises providing unpeeled potatoes cut into a french fried potato shape.

* * * * *